United States Patent
Patwardhan et al.

(10) Patent No.: US 10,521,307 B1
(45) Date of Patent: Dec. 31, 2019

(54) DIRECTORY SELECTIVE BACKUPS

(71) Applicant: EMC Corporation, Hopkinton, MA (US)

(72) Inventors: Kedar Patwardhan, Irvine, CA (US); Wallun Chan, Irvine, CA (US); Dale Terrien, Yorba Linda, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 626 days.

(21) Appl. No.: 15/194,890

(22) Filed: Jun. 28, 2016

(51) Int. Cl.
*G06F 17/30* (2006.01)
*G06F 11/14* (2006.01)
*G06F 16/18* (2019.01)

(52) U.S. Cl.
CPC ...... *G06F 11/1451* (2013.01); *G06F 16/1815* (2019.01)

(58) Field of Classification Search
CPC .................................................. G06F 11/1451
USPC .......................................................... 707/624
See application file for complete search history.

(56) References Cited

U.S. PATENT DOCUMENTS

| | | | | |
|---|---|---|---|---|
| 6,584,508 | B1 * | 6/2003 | Epstein | H04L 63/0245 709/225 |
| 7,386,546 | B1 * | 6/2008 | Santry | G06F 17/30067 |
| 2005/0050107 | A1 * | 3/2005 | Mane | G06F 17/30067 |
| 2005/0091287 | A1 * | 4/2005 | Sedlar | G06F 17/30233 |
| 2015/0317211 | A1 * | 11/2015 | Barnes | G06F 11/1451 707/646 |

* cited by examiner

*Primary Examiner* — Hicham Skhoun
(74) *Attorney, Agent, or Firm* — Workman Nydegger

(57) ABSTRACT

Backup operations on selected directories are performed in a computing system. File system operations that impact the ability to backup the selected directories are failed while other file system operations are allowed. In particular, file system operations that would require a trawl of the selected directory in order to perform the backup operation are failed.

20 Claims, 4 Drawing Sheets

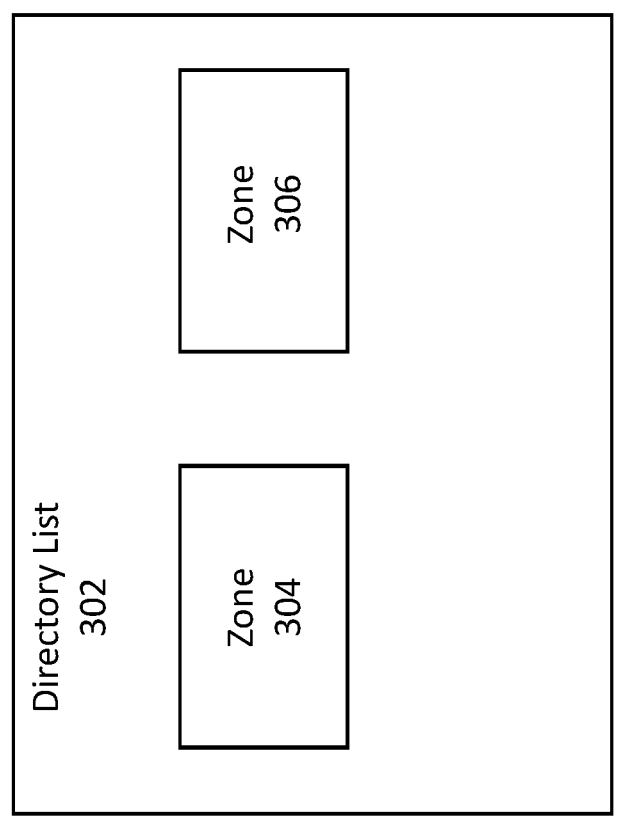

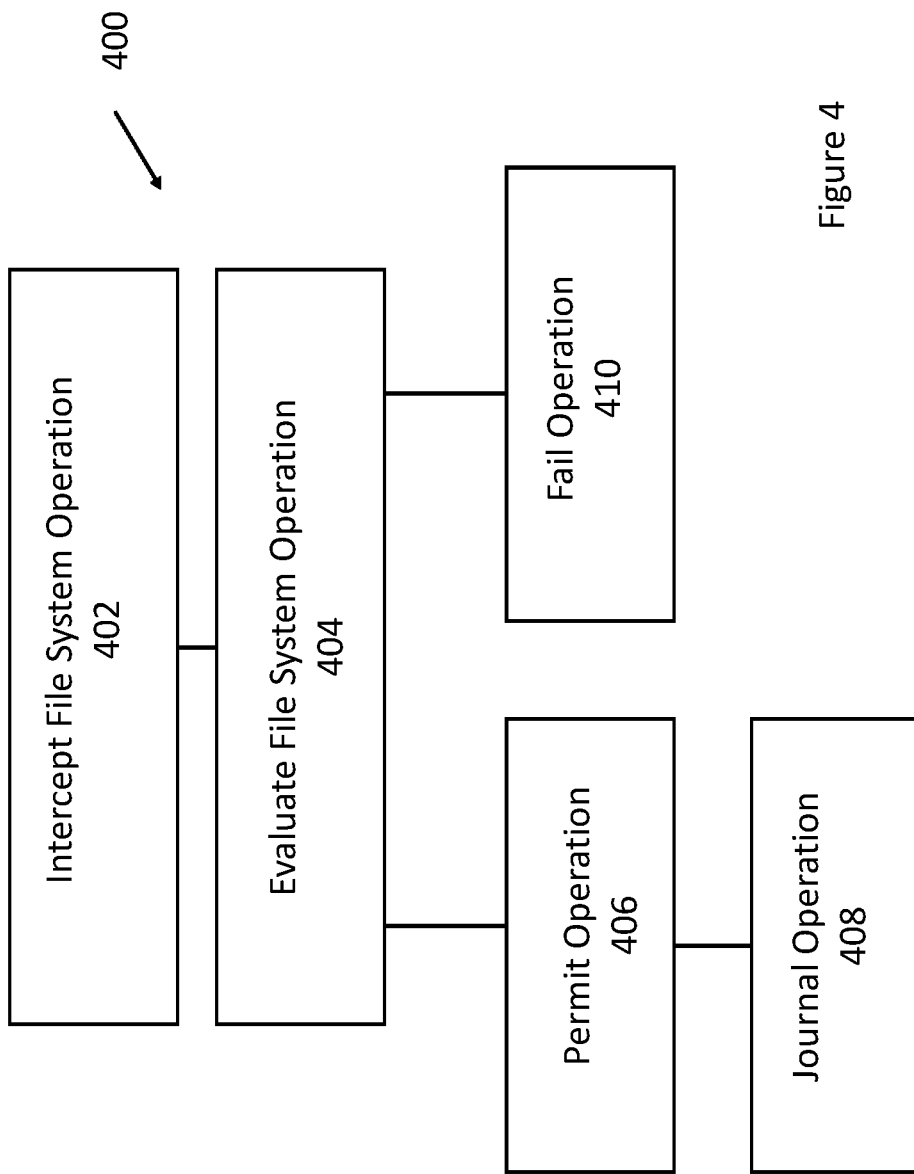

DIRECTORY SELECTIVE BACKUPS

FIELD OF THE INVENTION

Embodiments of the invention relate to systems and methods for protecting data. More particularly, embodiments of the invention relate to systems and methods for performing selective backup operations including directory selective backup operations.

BACKGROUND

Conventional backup systems are often required to trawl a file system in order to identify the files or data to be backed up. Every time a backup is performed, the system is trawled in order to identify the files that need to be handled by the backup system. This includes changed files, new files, and the like. Unfortunately, many file systems include a large amount of data or a large number of files. Trawling a large or high-density file system can require hours. Trawling the file system is becoming unacceptable due in part to the time requirement.

This problem is addressed in part by allowing the backup operation to be selective. More specifically, the backup system may be configured to backup only certain parts of a file system such as selected directories. However, backing up selected directories can lead to problems over time as files or directories are renamed, moved, or the like.

More specifically, when selectively backing up a directory in the context of a directory that is renamed into the directory selected for backup, it may be necessary to trawl at least a part of the directory. In addition, a storage snapshot can be used during the trawl. This proves cumbersome. In addition to taking a long time, storage snapshots however have several drawbacks. Storage snapshots increase Copy On Write (COW) overhead which can slow down the storage sub-system. Due to the COW overhead, application performance is degraded. Storage snapshots also require additional storage and cooperation from storage administrators. Systems and methods are needed that manage selective directory backups without requiring the file system be trawled during a backup operation.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 3 illustrates an example of a directory list used to handle file system operations that affect directories selected for backup operations;

FIG. 4 is an example of a method for handling file system operations that impact directories selected for backup operations.

DETAILED DESCRIPTION OF SOME EXAMPLE EMBODIMENTS

Figure 1:
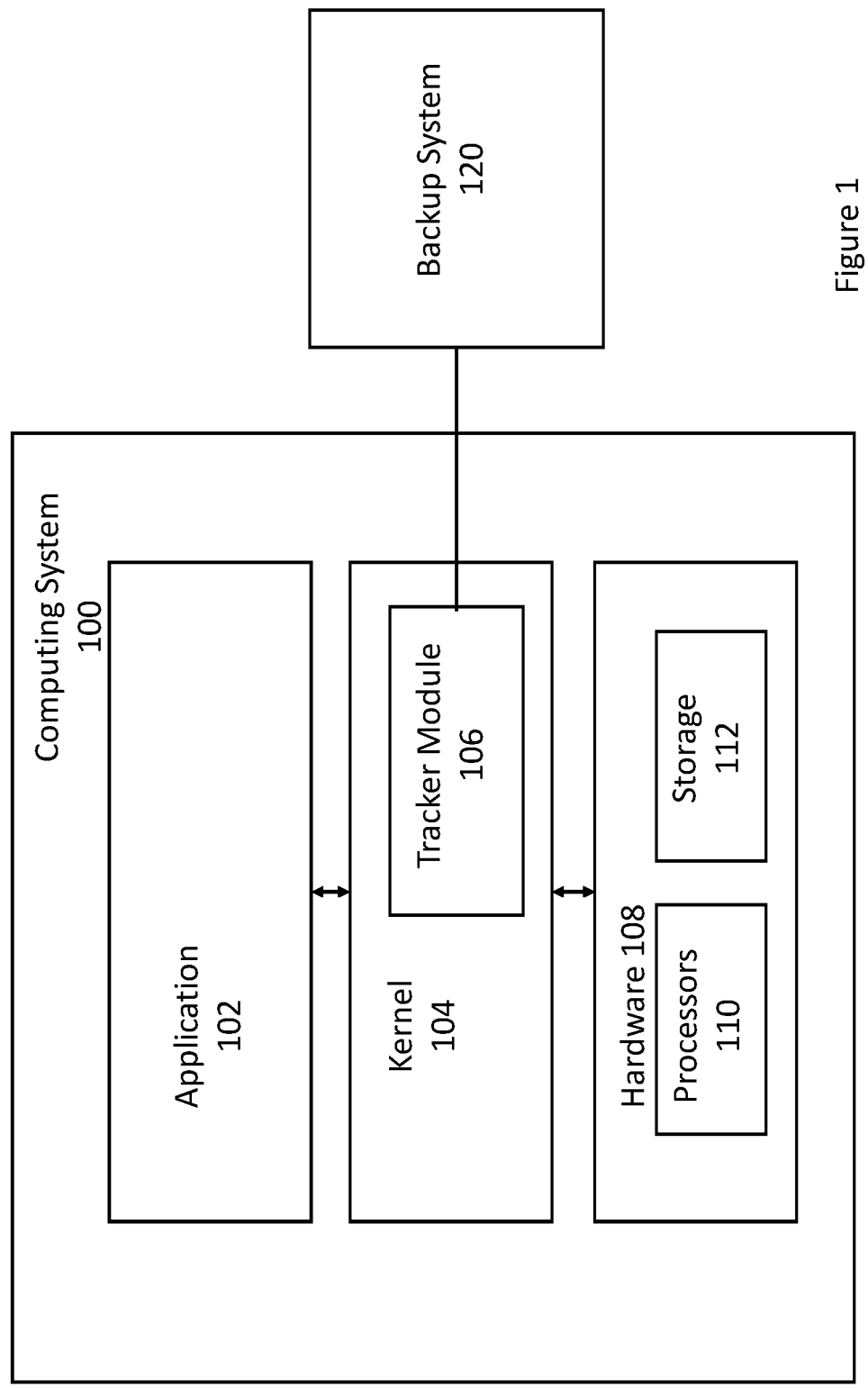
FIG. 1 illustrates an example of a computing environment for managing directory selective backup operations.

Embodiments of the invention relate to systems and methods for protecting data and more particularly to performing backup operations. Embodiments of the invention further relate to systems and methods for performing backup operations in a de-duplicated backup system. Embodiments of the invention further relate to systems and methods for performing backup-up operations without requiring a trawl of the file system or of selected zones or directories in the file system.

Source level de-duplication allows changes to a file system and to be identified and stored. Changes to a file system are journaled to a change list and the change list is subsequently used by a backup application to quickly identify all changes to the file system. The change list, for example, may identify changes occurring to the files since the last backup operation. The change list can be maintained, by way of example only, on a file basis, a block basis, or other unit. Consequently, the information in the change list can be used to perform an incremental backup of the file system.

The incremental backup can be performed without trawling the file system for the changes because the changes were journaled as they occurred in the file system. Source level de-duplication is performed by intercepting all operations that modify (e.g., move, write, delete, rename, new, copy etc.) files (or blocks) in a file system and storing the modifications or the locations of the modifications for subsequent use by a backup application. In one example, the modifications can be stored by identifying which blocks (files, container, or other storage unit) were affected by the file system operation.

In some examples, it may be desirable to perform a selective backup of a file system where, by way of example, only selected directories are backed up. This can create problems as directories are renamed, moved, hardlinked, incorporated, or the like. Embodiments of the invention ensure that selected directories can be backed up without having to trawl the file system or the selected directory (and sub trees) even as file operations occur in the file system. Further, embodiments of the invention ensure that selected directories can be backed up using incremental backups in the context of de-duplicated file systems. Embodiments of the invention include a module that, in one example, operates at a kernel level. The module is configured to intercept and evaluate the file system operations. If the file system operation interferes with the backup operation in the sense that it impacts the ability of the backup operation to backup a selected directory, then the file system operation is failed by the kernel module. Embodiments of the invention prevent certain file system operations from occurring in order to prevent certain scenarios from occurring. By failing certain file system operations, the backup operations can be selectively performed without requiring a system trawl and without requiring storage snapshots.

In one example, the kernel or tracker module may be included in the operating system or other application as a layered file system driver that intercepts all file system operations. Successful file system operations are logged into the journal. In other words, file systems operations that are allowed to proceed are journaled normally so that the changed blocks or files can be tracked in preparation for the next backup operation. Certain directory operations, however, are failed.

In one example, a directory including the sub-tree(s) of the directory is identified as a zone. The tracker module may maintain or have access to a list of zones in a directory list. The tracker module may also maintain or have access to a journal that stores or identifies changes associated with successful file operations. In order to ensure that backups of the selected zones or directories are successfully performed, a file system operation that renames a directory contained within one zone to another zone is failed by the tracker module. Because the rename operation is failed, no change is recorded in the journal by the tracker module.

For example, if the directory (dir1) constitutes a zone and an existing directory (dir21) were renamed to be inside dir1 (e.g., dir1/dir21), the operation would be failed by the tracker module.

A file system operation that renames a directory not contained within any zone to a path contained within a zone is also failed by the tracker module.

A hardlink create operation where both the source and target file names are not within the same zone is failed by the tracker module. If one of the source or target file names are within a zone but not both, the hardlink create operation is failed by the tracker module.

Any directory rename operation that modifies the path of a directory "selected" for backup is also failed. For example, if /dir1/dir2/dir4 was selected for backup, renames of directories /dir1 and /dir1/dir2 are failed by the tracker module or at this level of the file system. Directory rename operation within the same zone are always allowed.

Embodiments of the invention, by preventing at least the above described scenarios from occurring in a selective backup context, ensure that a file trawl is not required. In addition, a storage snapshot to support directory selective backups are similarly not required. In some examples, embodiments of the invention may allow these types of directory operations to be enabled. However, when enabled, it may be necessary to trawl the directories when the directory rename operations occur.

FIG. 1 illustrates an example of a computing environment that provides selective backup operations. FIG. 1 illustrates a computing system 100. The computing system 100 includes hardware 108 such as processors 110 and storage 112. The hardware 108 may be arranged as a single device, as multiple connected devices, or the like. The computing system 100 may be at least partially virtualized.

The data of the computing system 100 such as files is stored on the storage 112. The files may be arranged according to a file system that may determine how the files are named and placed in the storage 112. When an application 102 interacts with the hardware 108, the interaction is often controlled by a kernel 104, which is part of an operating system. The kernel 104 typically has significant if not complete control over actions and operations that occur in the computing system. In this example, the kernel 104 may connect the application 102 with the hardware 108.

During operation, the application 102 may perform a file system operation to access files or data in the storage 112. The file operation may result in a change to data or to a file in the storage 112. In this example, a level tracker module 106 is implemented in the kernel 104 or at the kernel level. This allows the tracker module 106 to intercept and evaluate file system operations performed by the application 102 or by another component of the computing system 100 prior to actually performing the file system operation.

The tracker module 106 may fail the file system operation or allow the file system operation. When the file system operation is allowed, the tracker module 106 may journal the change to the file system in a change list. If the operation is failed, the application may receive the fail notice and perform an alternative action or request additional input from a user.

The computing system may include or be associated with a backup system 120. The backup system 120 may be configured to backup the data or files in the storage 112. This is performed by backing up the blocks or files identified by the change list. Advantageously, the backup system 120 does not need to trawl the file system and does not need to rely on storage snapshots in some examples.

Figure 2:
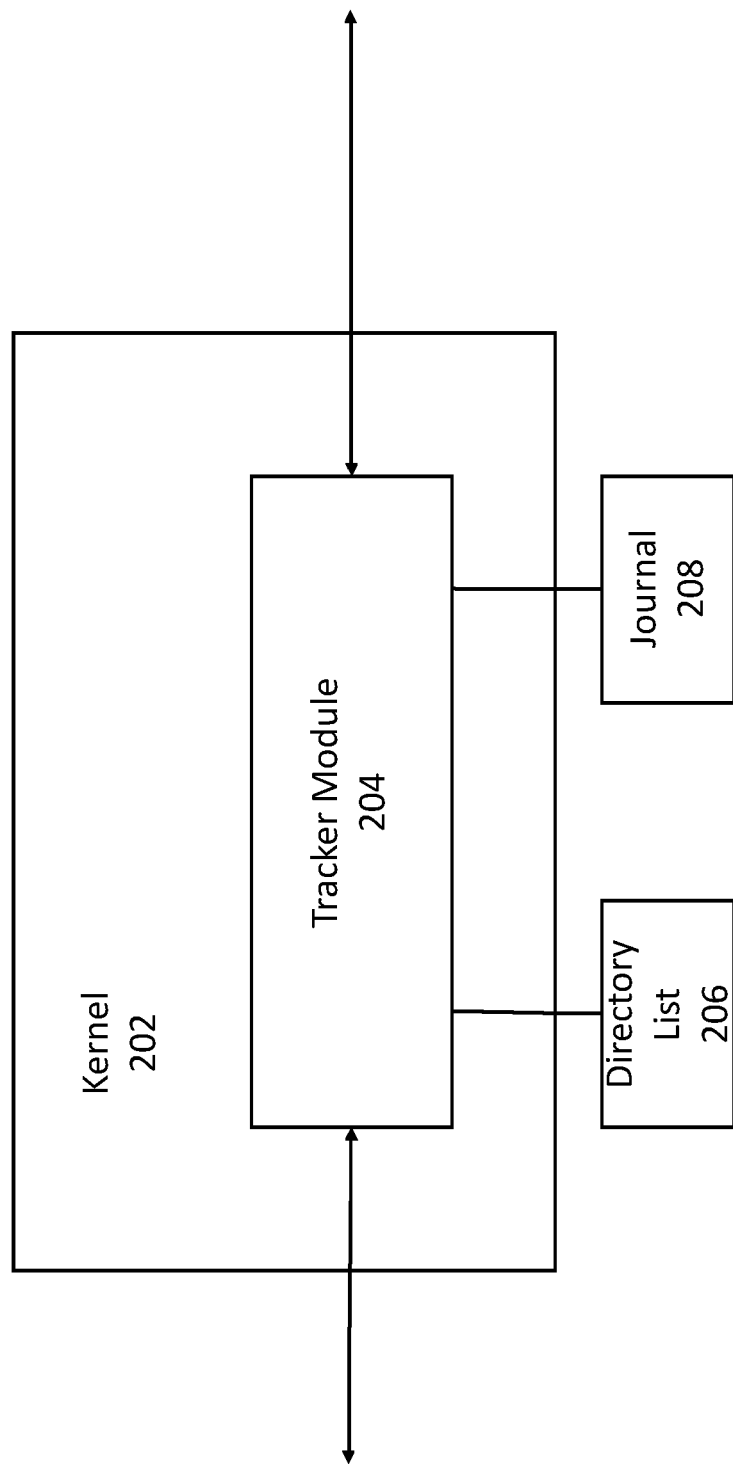
FIG. 2 illustrates an example of a kernel configured to process file system operations involved in directory selective backup operations.

FIG. 2 illustrates this process of handling a file system operation. The tracker module 204, which is an example of the tracker module 106, intercepts incoming file system operations. The intercepted file system operations are then evaluated in the context of a directory list 206. The directory list 206 identifies zones (a directory and its sub trees) that have been selected for backup. When the intercepted file system operation is determined to adversely impact the ability of the backup system to backup the zone, then the file system operation is failed. If the file system operation does not impact the ability to perform the backup operation of the zones in the directory list 206, then the file system operation is allowed and recorded in the journal 208.

FIG. 3 illustrates an example of a directory list 302. The directory list 302 may include multiple zones that have been selected for backup. Zones 304 and 306 are illustrated by way of example. The zones 304 and 306 are typically separate, but may have some overlap in some example. For example, the zone 304 may be a subtree of the zone 306. Further, the backup operations may be scheduled for the zones 304 and 306 to occur at different schedules and/or for different reasons.

In one example, file system operations that should fail can be identified by establishing rules. The file system operations that are failed include those that are contrary to or violate the rules. Examples include a situation where a sub-directory is renamed into a directory tree that was selected for backup. Any file system operation that violates this rule is failed. Further, a file system operation that renames a directory contained within one zone to another zone is failed. A file system operation that renames a directory not contained within any zone to a path contained within a zone is failed. A hardlink create operation where both the source file name and the target file name are not within the same zone is failed. A hardlink create operation where only one, but not both, of the source file name and the target file name are within a zone is failed. Any directory rename operation that modifies the path of a directory selected for backup is failed. Directory rename operations within the same zone, however, are always allowed.

FIG. 4 illustrates an example of a method for handling file system operations. The method 400 may begin by intercepting a file system operation in box 402. The file system operation is evaluated in box 404. Evaluating the file system operation may include evaluating the file system operation in light of zones that have been selected for backup and in light of rules that prohibit certain file system operations. If the file system operation is contrary to these rules, then the file system operation is failed in box 410. If the file system operation is not contrary to these rules, then the file system operation is allowed in box 406 and the file system operation is journaled as necessary in box 408.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation in a computing system, the method comprising:
   configuring the backup operation by identifying a zone to backup, the zone including at least a directory;
   intercepting a file system operation;
   evaluating the file system operation to determine whether the file system operation interferes with an ability of the backup operation to perform the backup operation to backup the zone;
   determining that the file system operation interferes with the ability of the backup operation to backup the zone; and
   failing the file system operation.

2. The method of claim 1, further comprising determining that the file system operation does not prevent the zone from being backed up and allowing the file system operation when the file system.

3. The method of claim 1, further comprising failing the file system operation when the file system operation renames a directory included in the zone from the zone to a second zone.

4. The method of claim 1, further comprising failing the file system when the file system operation renames a directory not contained in any zone to a path contained within the zone.

5. The method of claim 1, further comprising failing the file system when a hardlink create operation includes a source file name and a target file name that are not contained within the same zone.

6. The method of claim 5, further comprising failing the file system when only one of the source file name and the target file name are within the zone.

7. The method of claim 1, further comprising failing the file system operation when the file system operation modifies a path of a directory in the zone.

8. The method of claim 1, further comprising allowing directory rename operations within the zone.

9. The method of claim 1, further comprising journaling a change associated with the file system operation when the file system operation is not failed.

10. A method for performing a backup operation in a computing system that includes a file system, wherein the backup operation is configured to backup a zone that includes a directory and a subtree of the directory, the method comprising:
    receiving a file system operation from an application that is to be performed on the zone;
    determining whether the file system operation violates a rule associated with the zone that would prevent the backup operation from performing the backup operation and backing up the zone;
    failing the file system operation when the file system operation violates the rule and allowing the file system operation when the file system operation does not violate the rule.

11. The method of claim 10, wherein the rule includes failing the file system operation when the file system operation renames the directory from a first zone to the zone.

12. The method of claim 10, wherein the rule includes failing the file system when the file system operation renames a directory not contained in any zone to a path contained within the zone.

13. The method of claim 10, wherein the rule includes failing the file system when a hardlink create operation includes a source file name and a target file name that are not contained within the zone.

14. The method of claim 10, wherein the rule includes failing the file system when only one of the source file name and the target file name are within the zone.

15. The method of claim 10, wherein the rule includes failing the file system operation when the file system operation modifies a path of the directory in the zone.

16. The method of claim 10, wherein the rule includes allowing directory rename operations with the zone.

17. The method of claim 10, further comprising journaling a change associated with the file system operation when the file system operation is allowed.

18. An apparatus for managing file system operations on a zone selected for backup in a file system by a backup application, the apparatus comprising:
   hardware including a storage and a processor;
   a kernel;
   a tracker module including computer executable instructions implemented in the kernel,
      wherein the tracker module is configured to:
         intercept file system operations;
         evaluate the file system operations to determine whether the file system operations interfere with an ability of the backup application to perform a backup operation to backup the selected zone;
         determine that the file system operations interfere with the ability of the backup operation to backup the selected zone;
         fail the file system operations when the file system operations prevent the selected zone from being incrementally backed up without a trawl of the selected zone and allow the file system operations when the file system operations do not prevent the selected zone from being incrementally backed up without the trawl of the selected zone.

19. The apparatus of claim 18, wherein the tracker module is associated with a directory list and a journal, wherein changes to the file system are logged in the journal and wherein the directory list stores all zones selected for backup operations.

20. The apparatus of claim 18, wherein the tracker module fails the file system operations when at least one of:
   the file system operation renames a directory from a first zone to the selected zone;
   the file system operation renames a directory not contained in any zone to a path contained within the selected zone;
   a hardlink create operation includes a source file name and a target file name that are not contained within the selected zone or only one of the source file name and the target file name are within the selected zone; and
   the file system operation modifies a path of a directory in the selected zone.

* * * * *